United States Patent
Doherty et al.

(10) Patent No.: US 11,931,684 B2
(45) Date of Patent: Mar. 19, 2024

(54) AIR SEPARATION MODULES, NITROGEN GENERATION SYSTEMS, AND METHODS OF MAKING AIR SEPARATION MODULES

(71) Applicant: Hamilton Sundstrand Corporation, Charlotte, NC (US)

(72) Inventors: James R. Doherty, Feeding Hills, MA (US); Donald E. Army, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 845 days.

(21) Appl. No.: 16/710,810

(22) Filed: Dec. 11, 2019

(65) Prior Publication Data

US 2021/0178315 A1    Jun. 17, 2021

(51) Int. Cl.
*B01D 53/02* (2006.01)
*B01D 46/00* (2022.01)
*B01D 53/04* (2006.01)
*B01D 53/66* (2006.01)
(Continued)

(52) U.S. Cl.
CPC ..... *B01D 53/0415* (2013.01); *B01D 46/0036* (2013.01); *B01D 53/0446* (2013.01); *B01D 53/66* (2013.01); *B64D 37/32* (2013.01); *C01B 13/10* (2013.01); *B01D 2256/10* (2013.01); (Continued)

(58) Field of Classification Search
CPC .......... B01D 2053/224; B01D 2256/10; B01D 2257/104; B01D 2259/4525; B01D 2259/4575; B01D 2313/21; B01D 53/0415; B01D 53/0446; B01D 53/22; B01D 53/66; C01B 13/10
See application file for complete search history.

(56) References Cited

U.S. PATENT DOCUMENTS

| 3,796,026 A | 3/1974 | Mugford |
| 3,832,830 A | 9/1974 | Gerow |
| 5,410,999 A | 5/1995 | Gillespie et al. |

(Continued)

FOREIGN PATENT DOCUMENTS

| CN | 106268335 A | 1/2017 |
| EP | 3020467 A1 | 5/2016 |

(Continued)

OTHER PUBLICATIONS

European Search Report for Application No. 20213504.2, dated May 3, 2021, 108 pages.

(Continued)

*Primary Examiner* — Christopher P Jones
(74) *Attorney, Agent, or Firm* — CANTOR COLBURN LLP (57) ABSTRACT

An air separation module includes a canister having an inlet end and an outlet end arranged along a canister axis, a separator supported within the canister and arranged to separate a compressed air flow received at the air separation module into an oxygen-depleted air flow fraction and an oxygen-enriched air flow fraction, and an inlet cap. The inlet cap is seated about the inlet end of the canister, contains therein a portion of the separator, and has an oxygen-enriched air outlet port fluidly separated from the outlet end of the canister by the separator for diverting the oxygen-enriched air flow fraction to the external environment. Nitrogen generation systems and methods of making air separation modules are also described.

17 Claims, 4 Drawing Sheets

(51) Int. Cl.
*B64D 37/32* (2006.01)
*C01B 13/10* (2006.01)

(52) U.S. Cl.
CPC ............... *B01D 2257/104* (2013.01); *B01D 2259/4575* (2013.01)

(56) References Cited

U.S. PATENT DOCUMENTS

| | | |
|---|---|---|
| 8,110,027 B2 | 2/2012 | Beeson |
| 8,361,181 B2 | 1/2013 | Osendorf et al. |
| 8,979,983 B2 | 3/2015 | Eowsakul |
| 9,452,381 B2 | 9/2016 | Peacos, III et al. |
| 9,700,828 B2 | 7/2017 | Moredock et al. |
| 9,802,159 B2 | 10/2017 | Rekow et al. |
| 9,855,544 B2 | 1/2018 | Peacos, III et al. |
| 9,925,497 B2 | 3/2018 | Daniello |
| 9,932,125 B2 | 4/2018 | Mcauliffe et al. |
| 9,932,234 B2 | 4/2018 | Ipaniello |
| 2006/0201872 A1 | 9/2006 | Fall et al. |
| 2008/0190082 A1 | 8/2008 | Scott et al. |
| 2010/0024649 A1 | 2/2010 | Semmere et al. |
| 2012/0304856 A1 | 12/2012 | Kanetsuki et al. |
| 2012/0312162 A1 | 12/2012 | Theodore et al. |
| 2014/0331857 A1 | 11/2014 | Massey et al. |
| 2014/0360373 A1 | 12/2014 | Peacos et al. |
| 2015/0196871 A1 | 7/2015 | Komiya et al. |
| 2016/0136570 A1 | 5/2016 | Mcauliffe et al. |
| 2016/0184761 A1 | 6/2016 | Peacos, III et al. |
| 2016/0184793 A1 | 6/2016 | Peacos, III et al. |
| 2016/0243496 A1 | 8/2016 | Roussn-Bouchard et al. |
| 2017/0074699 A1 | 3/2017 | Mullin et al. |
| 2018/0087698 A1 | 3/2018 | Lenn et al. |
| 2018/0250625 A1 | 9/2018 | Pflueger |
| 2019/0336668 A1 | 11/2019 | Gyoten et al. |
| 2021/0178301 A1 | 6/2021 | Doherty et al. |
| 2021/0178302 A1 | 6/2021 | Doherty et al. |
| 2021/0178314 A1 | 6/2021 | Doherty et al. |
| 2021/0178320 A1 | 6/2021 | Doherty et al. |

FOREIGN PATENT DOCUMENTS

| | | |
|---|---|---|
| EP | 3040278 A1 | 7/2016 |
| EP | 3574937 A1 | 12/2019 |
| EP | 2717998 B1 | 9/2020 |
| GB | 2533585 A | 6/2016 |
| KR | 20180049598 A | 5/2018 |
| KR | 101863855 B1 | 6/2018 |
| WO | 02090823 A1 | 11/2002 |
| WO | 2013079466 A2 | 6/2013 |
| WO | 2017106644 A1 | 6/2017 |

OTHER PUBLICATIONS

US Notice of Allowance for U.S. Appl. No. 16/710,783, dated Aug. 3, 2022, 14 pages.
US Final Office Action for U.S. Appl. No. 16/710,795, dated Jun. 17, 22, 52 pages.
US Non Final Office Action for U.S. Appl. No. 16/710,761, dated Sep. 14, 2022, 27 pages.
US Notice of Allowance for U.S. Application No. 16/710,773, dated Jun. 7, 2022, 15 pages.
European Office Action; European Application No. 20213190.0; dated Jan. 7, 2022; 6 pages.
European Search Report for Application No. 20209734.1, dated May 11, 2021, 52 pages.
European Search Report for Application No. 20209888.5, dated May 11, 2021, 85 pages.
European Search Report for Application No. 20213190.0, dated Apr. 30, 2021, 107 pages.
European Search Report for Application No. 20213555.4, dated May 6, 2021, 155 pages.
Piquet Bruno: "Jul. 2009 Flight Air Worthiness", Jul. 31, 2009 (Jul. 31, 2009), pp. 1-36.
US Non Final Office Action for U.S. Appl. No. 16/710,783, dated Dec. 22, 2021, 12 pages.
US Non-Final Office Action for U.S. Appl. No. 16/710,773, dated Oct. 28, 21, 20 pages.
US Non-Final Office Action for U.S. Appl. No. 16/710,783, dated Jul. 14, 21, 20 pages.
US Non-Final Office Action for U.S. Appl. No. 16/710,795, dated Feb. 8, 22, 36 pages.
US Notice of Allowance for U.S. Appl. No. 16/710,773, dated Feb. 23, 22, 8 pages.
US Restriction Requirement for U.S. Appl. No. 16/710,795, dated Oct. 13, 21, 7 pages.
EPO Official Letter for Application No. 20213555.4, dated Oct. 19, 2022, 22 pages.
US Final Office Action for U.S. Appl. No. 16/710,795, dated Nov. 7, 22, 23 pages.
EPO Official Letter for Application No. Application No. 20209888. 5, dated Mar. 13, 2023, 9 Pages.
Final Office Action for U.S. Appl. No. 16/710,795, dated Mar. 29, 23, 19 pages.
EPO Official Letter for Application No. 20213504.2, dated Nov. 13, 2023, 4 pages.

AIR SEPARATION MODULES, NITROGEN GENERATION SYSTEMS, AND METHODS OF MAKING AIR SEPARATION MODULES

BACKGROUND

The present disclosure generally relates to nitrogen generation systems, and more particularly to air separation modules for generating oxygen-depleted air in nitrogen generating systems.

Vehicles, such as aircraft, commonly carry liquid fuel in fuel tanks. The fuel tanks generally define an interior ullage space between the liquid fuel and the interior of the fuel tank. The ullage space is typically occupied by a mixture of fuel vapor and ambient air. Such fuel vapor-air mixtures can present a fire hazard concentration of oxygen within the ullage space is sufficient to support combustion. To limit (or eliminate entirely) the combustion risk posed by such fuel vapor-air mixtures some vehicles employ inerting systems to control oxygen concentration with the vehicle fuel tank. Examples of inerting systems include nitrogen generation systems with air separation modules. The air separation modules in such inerting system can be employed to communicate oxygen-depleted air flows to the vehicle fuel tank to limit oxygen concentration within the fuel tank ullage space.

Air separation modules typically separate pressurized air into an oxygen-depleted fraction and an oxygen-enriched fraction. The oxygen-depleted air flow is generally communicated to the vehicle fuel tank, that the oxygen-depleted air flow limits concentration of oxygen within the fuel tank. The oxygen-enriched air flow is typically diverted to the external environment. The oxygen-depleted air flow generation capacity of the air separation module is typically limited by external support structure and/or framing employed to structurally support the air separation module.

Such systems and methods have generally been acceptable for their intended purpose. However, there remains a need for improved air separation modules, nitrogen generation systems, and methods of making air separation modules for nitrogen generation systems.

BRIEF DESCRIPTION

An air separation module is provided. The air separation module includes a canister having an inlet end and an outlet end arranged along a canister axis, a separator supported within the canister and configured to separate a compressed air flow received at the air separation module into an oxygen-depleted air flow fraction and an oxygen-enriched air flow fraction, and an inlet cap. The inlet cap is seated about the inlet end of the canister, contains therein a portion of the separator, and has an oxygen-enriched air outlet port fluidly separated from the outlet end of the canister by the separator for diverting the oxygen-enriched air flow fraction to the external environment.

In addition to one or more of the features described above, or as an alternative, further examples of the air separation module may include that the canister has an oxygen-enriched air duct, the oxygen-enriched air duct extending tangentially from the inlet cap.

In addition to one or more of the features described above, or as an alternative, further examples of the air separation module may include that the inlet cap and the canister define between one another an annular oxygen collection plenum, the annular oxygen collection plenum fluidly coupling the separator with the oxygen-enriched air outlet port.

In addition to one or more of the features described above, or as an alternative, further examples of the air separation module may include that the inlet cap has an inlet cap flange connecting the inlet cap to the canister, and further including a face seal member arranged axially between the inlet cap flange and the canister.

In addition to one or more of the features described above, or as an alternative, further examples of the air separation module may include that the separator includes a resin body portion coupled to a canister portion by an inlet cap portion, the resin body portion and the canister portion of the separator contained within the inlet cap.

In addition to one or more of the features described above, or as an alternative, further examples of the air separation module may include that the inlet cap portion of the separator is contained within the canister, and that the inlet cap portion of the separation is radially overlapped by the inlet cap.

In addition to one or more of the features described above, or as an alternative, further examples of the air separation module may include that the separator includes a hollow fiber mat supported within the inlet cap by the resin body portion of the separator.

In addition to one or more of the features described above, or as an alternative, further examples of the air separation module may include that the resin body portion of the separator is contained within the inlet cap and bounds an inlet cap plenum defined axially between the inlet cap and the resin body portion of the separator, and further that the air separation module further include a radial seal member radially compressed between the inlet cap and the resin body portion of the separator.

In addition to one or more of the features described above, or as an alternative, further examples of the air separation module may include that the canister is a one-piece body including a perforated portion, the canister and the performed portion homogenous in composition and monolithic in construction In addition to one or more of the features described above, or as an alternative, further examples of the air separation module may include a compressed air source fluidly coupled to the separator by the inlet cap, and therethrough disposed in fluid communication with the oxygen-enriched air outlet port.

In addition to one or more of the features described above, or as an alternative, further examples of the air separation module may include that the canister has a perforated portion, the perforated portion of the canister fluidly coupling the separator with the oxygen-enriched air outlet port.

In addition to one or more of the features described above, or as an alternative, further examples of the air separation module may include that the perforated portion of the canister is contained within the inlet cap.

In addition to one or more of the features described above, or as an alternative, further examples of the air separation module may include an outlet cap seated on the outlet end of the canister, wherein the outlet cap has an outlet cap axial length, wherein the inlet cap has an inlet cap axial length, and wherein the inlet cap axial length is greater than the outlet cap axial length In addition to one or more of the features described above, or as an alternative, further examples of the air separation module may include that the canister has a canister inlet flange extending about the canister, the canister inlet flange connecting the inlet cap to the canister, the canister inlet flange arranged axially between the perforated portion of the canister and the outlet end of the canister.

In addition to one or more of the features described above, or as an alternative, further examples of the air separation module may include that the canister contains a tube sheet locating feature, the tube sheet locating feature contained within the canister and radially separated from the inlet cap by the separator.

In addition to one or more of the features described above, or as an alternative, further examples of the air separation module may include a fuel tank in fluid communication with the outlet end of the canister, the separator fluidly coupling the fuel tank to the inlet cap, the separator fluidly separating the fuel tank from the oxygen-enriched air outlet port.

In addition to one or more of the features described above, or as an alternative, further examples of the air separation module may include that the canister has a canister inlet flange extending about the inlet end of the canister, that the canister has a canister outlet flange extending about the outlet end of the canister, and that the canister extends continuously and without a port between the canister inlet flange and the canister outlet flange.

A nitrogen generation system is also provided. The nitrogen generation system includes an air separation module as described above. The inlet cap and the canister define between one another an annular oxygen collection plenum, the annular oxygen collection plenum fluidly coupling the separator with the oxygen-enriched air outlet port. A compressed air source is fluidly coupled to the separator by the inlet cap, and therethrough is disposed in fluid communication with the oxygen-enriched air outlet port. A fuel tank is in fluid communication with the outlet end of the canister, the separator fluidly coupling the fuel tank to the inlet cap, the separator fluidly separating the fuel tank from the oxygen-enriched air outlet port.

In addition to one or more of the features described above, or as an alternative, further examples of the nitrogen generation system may include the canister has a perforated portion, the perforated portion of the canister fluidly coupling the separator with the oxygen-enriched air outlet port; and that the separator includes a resin body portion coupled to a canister portion by an inlet cap portion, the resin body portion and the canister portion of the separator contained within the inlet cap.

In addition to one or more of the features described above, or as an alternative, further examples of the air separation module may include an ozone converter supported by the inlet cap; an inlet temperature sensor fluidly coupling the ozone converter to the separator; an oxygen sensor fluidly coupled to the inlet temperature sensor by the separator; an outlet temperature sensor fluidly coupled to the separator by the oxygen sensor; and a flow control valve fluidly coupled to the oxygen sensor by the outlet temperature sensor.

A method of making an air separation module includes defining a canister having an inlet end and an outlet end arranged along a canister axis; supporting a separator within the canister, the separator arranged to separate a compressed air flow received at the air separation module into an oxygen-depleted air flow fraction and an oxygen-enriched air flow fraction; seating an inlet cap about the inlet end of the canister such that the inlet cap contains therein a portion of the separator; and fluidly separating an oxygen-enriched air outlet port from the outlet end of the canister with the separator for diverting the oxygen-enriched air flow fraction to the external environment.

In addition to one or more of the features described above, or as an alternative, further examples of the method may include compressing a face seal member axially between the canister and the inlet cap; compressing a radial seal member radially between the separator and the inlet cap; defining an annular oxygen collection plenum between the canister and the inlet cap; and fluidly coupling the separator with the oxygen-enriched air outlet port with the annular oxygen collection plenum.

Technical effects of the present disclosure include air separation modules having relatively large oxygen-depleted air flow generating capacity (inerting capability) relative to space occupied by the air separation module. In certain examples air separation modules described herein inlet caps having oxygen-enriched air output ports. In accordance with certain examples air separation modules have inlet caps containing a portion of the separator, allowing the separator to be larger than the canister containing the separator. It is also contemplated that, in accordance with certain examples, air separation modules include canisters with perforated portions in communication with the oxygen-enriched air outlet port for diverting oxygen-enriched air, separated from compressed air received by the separator, to the ambient environment. Diversion can be accomplished, for example, via a collection annulus defined by the inlet cap.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
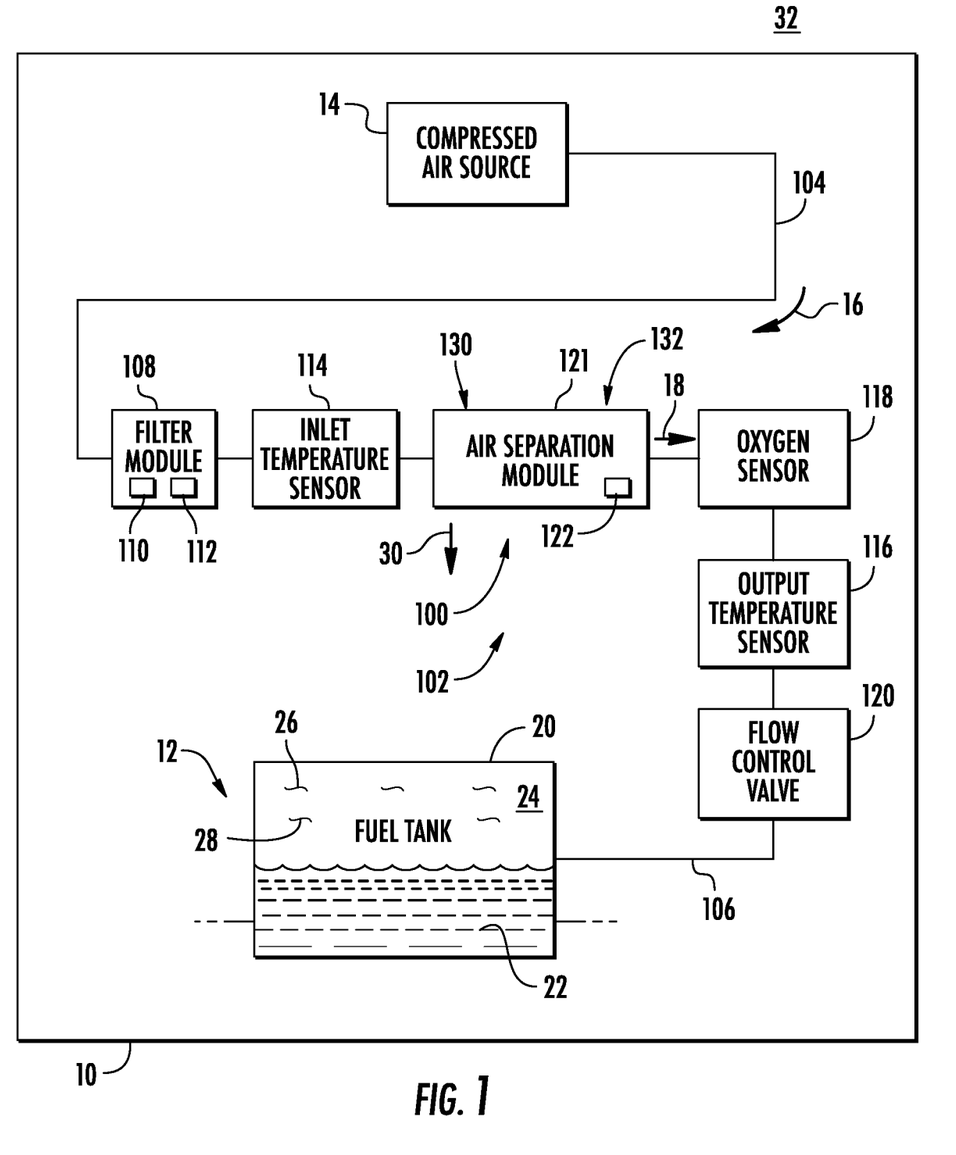
FIG. 1 is a schematic view of a nitrogen generation system constructed in accordance with the present disclosure, showing air separation module having an inlet cap with an oxygen-enriched air outlet port diverting oxygen-enriched air separated from a compressed air flow to the ambient environment.

Reference will now be made to the drawings wherein like reference numerals identify similar structural features or aspects of the subject disclosure. For purposes of explanation and illustration, and not limitation, a partial view of an example of an air separation module constructed in accordance with the disclosure is shown in FIG. 1 and is designated generally by reference character 100. Other examples of air separation modules, nitrogen generation systems, and methods of making air separation modules, are provided in FIGS. 2-4, as will be described. The systems and methods described herein can be used for generating oxygen-depleted (e.g., nitrogen-enriched) air flows for inerting fuel tanks, such as fuel tanks carried by aircraft, though the present disclosure is not limited to inerting fuel tanks on aircraft or to fuel systems in general.

Referring to FIG. 1, a vehicle 10, e.g., an aircraft is shown. The vehicle 10 includes a fuel system 12, a compressed air source 14, and a nitrogen generation system 102. The nitrogen generation system 102 includes the air separation module 100, a source conduit 104, and a supply conduit 106. The source conduit 104 fluidly connects the compressed air source 14 to the air separation module 100 to communicate a compressed air flow 16 to the air separation module 100. The air separation module 100 is configured to separate an oxygen-depleted air flow fraction 18 from the compressed air flow 16. The supply conduit 106 fluidly connects the air separation module 100 to the fuel system 12 to provide thereto the oxygen-depleted air flow fraction 18. In certain examples the nitrogen generation system 102 is an onboard inert gas generation system (OBIGGS) for an aircraft.

The fuel system 12 includes a fuel tank 20. The fuel tank 20 is fluidly coupled to the air separation module 100 by the supply conduit 106 and contains within its interior a liquid fuel 22. The liquid fuel 22 and the interior of the fuel tank 20 define between one another an ullage space 24. The ullage space 24 harbors an atmosphere with a mixture including a fuel vapor 26 and nitrogen 28. The fuel vapor 26 is combustible in the presence of oxygen in concentration above a combustion threshold.

The nitrogen 28 is provided by the oxygen-depleted air flow fraction 18 and is maintained in concentration sufficient to maintain concentration of oxygen with the ullage space below the combustion threshold of the fuel vapor 26. Limiting oxygen concentration limits (or prevents entirely) possibility of combustion of the fuel vapor 26 in the event that an ignition source communicates with the fuel vapor 26.

The compressed air source 14 is configured to provide the compressed air flow 16 (or pressurized air flow) using air ingested from the external environment 32. In certain examples the compressed air source 14 includes an engine, such as the compressor section of gas turbine engine carried by an aircraft. In accordance with certain examples the compressed air source 14 includes an external compressed air source, such as a ground support equipment cart or facility compressed air source.

The nitrogen generation system 102 includes the air separation module 100, a filter module 108 containing a debris filter 110 and an ozone converter 112, and an inlet temperature sensor 114. The nitrogen generation system 102 also includes an outlet temperature sensor 116, an oxygen sensor 118, and a flow control valve 120.

The filter module 108 fluidly couples the source conduit 104 to the inlet temperature sensor 114 to communicate thereto the compressed air flow 16. The debris filter 110 is configured to impound debris entrained within the compressed air flow 16.

The ozone converter 112 is also to convert ozone molecules included within the compressed air flow 16 into dioxygen molecules, preventing the entrained ozone molecules from reaching the air separation module 100. As will be appreciated by those of skill in the art in view of the present disclosure, entrained debris and/or ozone can limit the reliability of the air separation module 100.

The inlet temperature sensor 114 is configured to measure temperature of the compressed air flow 16 provided to the air separation module 100. In this respect the inlet temperature sensor 114 fluidly couples the filter module 108 to the air separation module 100 for measuring temperature of the compressed air flow 16 received from the supply conduit 106 via the filter module 108 subsequent to filtering and ozone conversion. In certain examples the inlet temperature sensor 114 is disposed in communication with a controller, which adjusts temperature of the compressed air flow 16 to maintain the compressed air flow 16 within a predetermined inlet temperature range.

The air separation module 100 includes a separator 122. The separator 122 is configured to separate the compressed air flow 16 into the oxygen-depleted air flow fraction 18 and an oxygen-enriched air flow fraction 30. The oxygen-enriched air flow fraction 30 is diverted from the fuel system 12 by the air separation module 100, e.g., is dumped overboard. The oxygen-depleted air flow fraction 18 is communicated by the air separation module 100 to the fuel system 12 via the outlet temperature sensor 116, the oxygen sensor 118, and the flow control valve 120. In certain examples the separator 122 includes a hollow fiber mat 124 (shown in FIG. 3) configured to separate the compressed air flow 16 into the oxygen-depleted air flow fraction 18 and the oxygen-enriched air flow fraction 30. Examples of suitable hollow fiber mats include PEEK-Sep™ hollow fiber mats, available from Air Liquide Advanced Separations of Wobum, Massachusetts.

The outlet temperature sensor 116 is configured to measure temperature of the oxygen-depleted air flow fraction 18 prior to the oxygen-depleted air flow fraction 18 reaching the fuel system 12. In this respect the outlet temperature sensor 116 fluidly couples the air separation module 100, and therein the separator 122, to the oxygen sensor 118 to measure temperature of the oxygen-depleted air flow fraction 18. It is contemplated the outlet temperature sensor 116 provide a signal to a controller indicative of temperature of the oxygen-depleted air flow fraction 18, the controller thereby able to control of the oxygen-depleted air flow fraction 18 communicated to the fuel system 12.

The oxygen sensor 118 is configured to measure concentration of oxygen within the oxygen-depleted air flow fraction 18 prior to the oxygen-depleted air flow fraction 18 reaching the fuel system 12. In this respect the oxygen sensor 118 fluidly couples the outlet temperature sensor 116 to the flow control valve 120, and therethrough to the supply conduit 106, to measure oxygen concentration within the oxygen-depleted air flow fraction 18 received from the separator 122 as the oxygen-depleted air flow fraction 18 traverses the air separation module 100. It is contemplated that the oxygen sensor 118 provide a signal to a controller indicative of oxygen concentration within the oxygen-depleted air flow fraction 18, the controller thereby able to monitor performance of the air separation module 100.

The flow control valve 120 is configured to control flow rate, e.g., mass flow rate, of the oxygen-depleted air flow fraction 18 to the supply conduit 106. In this respect the flow control valve 120 fluidly couples the oxygen sensor 118 to the supply conduit 106 throttle flow of the oxygen-depleted air flow fraction 18 to the fuel system 12. It is contemplated that the flow control valve 120 be operatively associated with a controller to throttle the flow rate of the oxygen-depleted air flow fraction 18 according to the inerting requirements of the fuel system 12 and/or according to the operating requirements of the vehicle 10.

As will be appreciated by those of skill in the art in view of the present disclosure, the inerting capability provided by air separation modules generally corresponds to the weight and size of the air separation module. To limit weight and size per unit inerting capability the air separation module 100 is provided.

Figure 2:
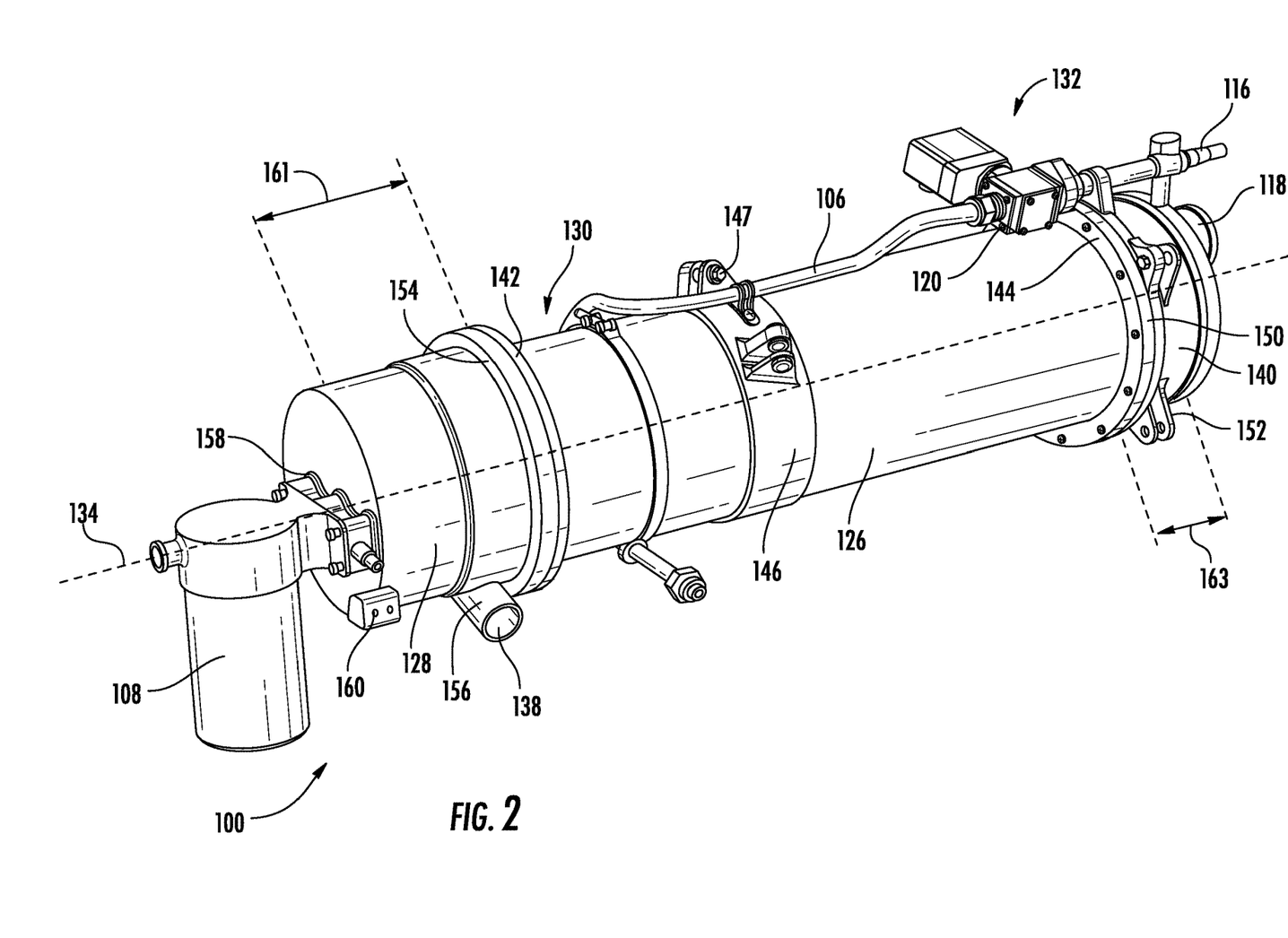
FIG. 2 is a perspective view of the air separation module of FIG. 1 according to an example, showing the inlet cap and an outlet cap seated on axially opposite ends of a canister.

The air separation module 100 generally includes the separator 122, a canister 126 (shown in FIG. 2), and an inlet cap 128 (shown in FIG. 2). The canister 126 has an inlet end 130 and an outlet end 132 arranged along a canister axis 134 (shown in FIG. 2). The separator 122 is supported within the canister 126 and is arranged to separate a compressed air flow, e.g., the compressed air flow 16, received at the air separation module 100 into an oxygen-depleted air flow fraction, e.g., the oxygen-depleted air flow fraction 18, and an oxygen-enriched air flow fraction, e.g., the oxygen-enriched air flow fraction 30. The inlet cap 128 (e.g., an inlet end cap) is seated about the inlet end 130 of the canister 126, contains therein a portion 136 (shown in FIG. 3) of the separator 122 and has an oxygen-enriched air outlet port 138. The oxygen-enriched air outlet port 138 is fluidly separated from the outlet end 132 of the canister 126 by the separator 122 for diverting the oxygen-enriched air flow fraction to the external environment 32.

With reference to FIG. 2, the air separation module 100 includes the canister 126, the inlet cap 128, and an outlet cap 140 (e.g., an outlet end cap). The canister 126 defines the canister axis 134 and has canister inlet flange 142, and a canister outlet flange 144. The canister inlet flange 142 extends about the canister 126. The canister inlet flange 142 extends about the inlet end 130 of the canister 126. The canister outlet flange 144 extends about the outlet end 132 of the outlet end 132 of the canister 126. In certain examples the canister 126 has no oxygen-enriched air outlet port defined between the canister inlet flange 142 and the canister outlet flange 144, the oxygen-enriched air outlet port 138 instead defined by the inlet cap 128. In the illustrated example the canister 126 has a band 146, e.g., a doubler) with a canister fixation feature 147 extending laterally therefrom arranged between the canister inlet flange 142 and the canister outlet flange 144 for fixation of the air separation module 100 to vehicle structure, e.g., the vehicle 10 (shown in FIG. 1), through the canister 126.

The outlet cap 140 has an output cap flange 150 and an output cap fixation feature 152. The output cap flange 150 connects the outlet cap 140 to the canister outlet flange 144 and therethrough to the canister 126. The output cap fixation feature 152 extends laterally from the outlet cap 140 and is arranged for fixation of the air separation module 100 to vehicle structure, e.g., the vehicle 10 (shown in FIG. 1), through the outlet cap 140. In the illustrated example the oxygen sensor 118, outlet temperature sensor 116, and the flow control valve 120 are each supported by the outlet cap 140. In this respect the output cap flange 150 of the outlet cap 140 and the canister outlet flange 144 of the canister 126 cooperate to communicate the load of the canister 126, the outlet cap 140, the oxygen sensor 118, the outlet temperature sensor 116, and the flow control valve 120 through the canister fixation feature 148 and the outlet cap fixation feature 152.

The inlet cap 128 is similar the outlet cap 140 and additionally has an inlet cap flange 154, an oxygen-enriched air duct 156, a filter module mount 158, and an inlet cap fixation feature 160. The inlet cap flange 154 connects the inlet cap 128 to the canister inlet flange 142 and therethrough to the canister 126. The filter module mount 158 supports the filter module 108 and fluidly couples the filter module 108 to the canister 126. The inlet cap fixation feature 160 extends laterally from the inlet cap 128 and is arranged for fixation of the air separation module 100 to vehicle structure, e.g., the vehicle 10 (shown in FIG. 1), through the inlet cap 128. It is contemplated that the filter module 108 be supported by the inlet cap 128, e.g., cantilevered therefrom, a portion of the load associated with the filter module 108 communicated through the inlet cap flange 154 and the canister inlet flange 142.

The oxygen-enriched air duct 156 extends tangentially from the inlet cap 128 and defines the oxygen-enriched air outlet port 138. In certain examples the inlet cap 128 and oxygen-enriched air duct 156 are monolithically formed as a one-piece body of homogeneous composition, e.g., as a casting or as an additively manufactured article, simplifying assembly of the air separation module. In accordance with certain examples the inlet cap 128, the oxygen-enriched air duct 156, and the filter module mount 158 can be monolithically formed as a one-piece body of homogenous composition, e.g., as a casting or as an additively manufactured article, further simplifying assembly of the air separation module 100. As shown in FIG. 2 the inlet cap 128 has an inlet cap axial length 161 that is greater than an outlet cap axial length 163 of the outlet cap 140, the inlet cap 128 thereby arranged to contain therein a portion of the separator 122. This increases the volume within the air separation module 100 available for the separator 122 for a given canister length between the canister inlet flange 142 and the canister outlet flange 144.

Figure 3:
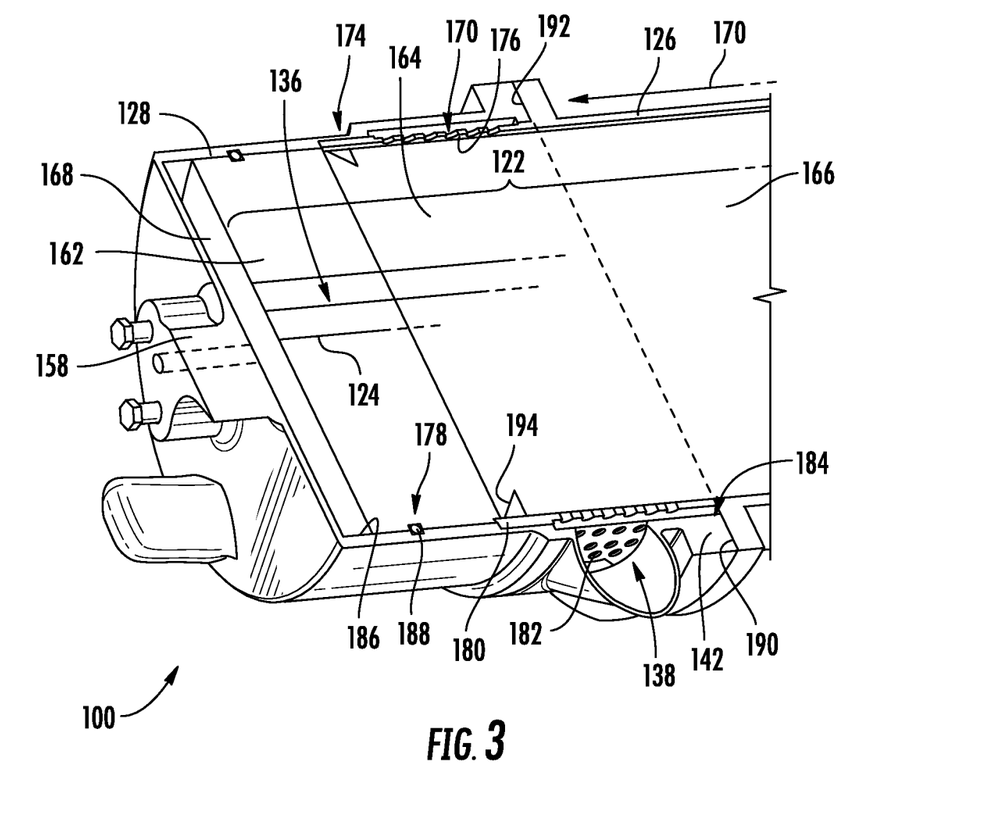
FIG. 3 is a longitudinal cross-sectional view of a portion of the air separation module of FIG. 1 including the inlet cap, showing a resin portion and an inlet cap portion of a separator contained within the inlet cap.

With reference to FIG. 3, a portion of the air separation module 100 including the inlet cap 128 and the canister 126 is shown. The separator 122 includes a resin body portion 162, an inlet cap portion 164, and a canister portion 166. The canister portion 166 is contained within the canister 126 and is connected to the resin body portion 162 by the inlet cap portion 164. The inlet cap portion 164 of the separator 122 is contained within the canister 126, is further contained within the inlet cap 128, and couples the canister portion 166 of the separator 122 to the resin body portion 162 of the separator 122. The resin body portion 162 extends axially from the canister 126 in the direction of the filter module mount 158, is contained within the inlet cap 128 and bounds an inlet cap plenum 168 defined between the resin body portion 162 and the inlet cap 128. In certain examples the resin body portion 162 provides structural support to the hollow fiber mat 124 of the separator 122, e.g., by presenting a machined surface to the inlet cap plenum 168 through which hollow fibers of the hollow fiber mat 124 fluidly communicate with the inlet cap plenum 168. In accordance the certain examples the canister 126 contains a tube sheet locating feature 194, the tube sheet locating feature 194 contained within the canister 126 and radially separated from the inlet cap 128 by the separator 122 to axially fix the separator relative to the canister 126.

The canister 126 is partially contained with the inlet cap 128 and this respect has an inter-flange portion 170, a perforated portion 172, and rim portion 174. The inter-flange portion 170 of the canister 126 extends between the canister outlet flange 144 (shown in FIG. 2) and the canister inlet flange 142. The perforated portion 172 of the canister 126 extends axially from inter-flange portion 170 of the canister 126 in a direction opposite the canister inlet flange 142, connects the inter-flange portion 170 of the canister 126 to the rim portion 174 of the canister 126, and has a plurality of perforations 176 extending radially therethrough. In certain examples canister 126 is a one-piece body including the perforated portion 172, the canister both homogenous in composition and monolithic in construction to provide structural strength to the canister 126.

The plurality of perforations 176 fluidly couple the separator 122 with the oxygen-enriched air outlet port 138 through the oxygen-enriched air duct 156 (shown in FIG. 2), and in the illustrated example are distributed circumferentially about the circumference of the canister 126. The rim portion 174 of the canister 126 extends axially from the perforated portion 172 of the canister 126 in a direction axially opposite the canister inlet flange 142, is contained within the inlet cap 128 and is connected to the inter-flange portion 170 of the canister 126. In the illustrated example both the perforated portion 172 of the canister 126 and the rim portion 174 of the canister 126 are radially overlapped by the inlet cap 128, the perforated portion 172 and the rim portion 174 thereby cooperating with the resin body portion 162 of the separator 122 to support and protect the hollow fiber mat 124 during assembly of the inlet cap 128 on the canister 126.

The inlet cap 128 defines a radial seal slot 178, a canister seat 180, an annular oxygen collection plenum 182, and a face seal slot 184. The radial seal slot 178 extends circumferentially about an interior surface 186 of the inlet cap 128, is defined axially between inlet cap plenum 168 and the canister seat 180, and seats therein a radial seal member 188. The radial seal member 188 is radially compressed between the resin body portion 162 of the separator 122 and the interior surface 186 of the inlet cap 128 to fluidly separate the oxygen-enriched air outlet port 138 from the inlet cap plenum 168. The canister seat 180 is defined by the interior surface 186 of the inlet cap 128, extends circumferentially about the rim portion 174 of the canister 126 and radially outward thereof, and receives therein the rim portion 174 of the canister 126.

The annular oxygen collection plenum 182 is defined between the interior surface 186 of the inlet cap 128 and the separator 122, and more particularly between the interior surface 186 of the inlet cap 128 and the perforated portion 172 of the canister 126, and fluidly couples the separator 122 to the oxygen-enriched air outlet port 138 of the inlet cap 128. The face seal slot 184 is defined within an axial face 190 of the inlet cap flange 154, extends circumferentially about the separator 122, and seats therein a face seal member 192. The face seal member 192 is axially compressed between the canister inlet flange 142 and the inlet cap flange 142, the face seal member 192 thereby fluidly separating the annular oxygen collection plenum 182 from the external environment 32 (shown in FIG. 1) and thereby limiting fluid communication between the annular oxygen collection plenum 182 and the external environment 32 to the oxygen-enriched air outlet port 138.

During operation the compressed air flow 16 (shown in FIG. 1) enters the inlet cap plenum 168 through the filter module mount 158. The inlet cap plenum 168 communicates the compressed air flow 16 to the separator 122, e.g., to hollow fibers of the hollow fiber mat 124. The hollow fibers convey the compressed air flow 16 through the resin body portion 162 of the separator 122 and therethrough to the canister portion 166 of the separator 122. As the compressed air flow 16 traverses the canister portion 166 of the separator 122 oxygen molecules of the compressed air flow traverse (e.g., driven by pressure) walls of the hollow fibers and collect in the annular oxygen collection plenum 182. The annular oxygen collection plenum 182 diverts the oxygen molecules to the external environment 32 (shown in FIG. 1) as the oxygen-enriched air flow fraction 30 (shown in FIG. 1) through the oxygen-enriched air outlet port 138. The hollow fibers of the hollow fiber mat 124 in turn convey nitrogen molecules of the compressed air flow 16 to the outlet end 132 of the canister 126, and therethrough to the fuel tank 20 (shown in FIG. 1) as the oxygen-depleted air flow fraction 18 (shown in FIG. 1) wherein the oxygen-depleted air flow fraction 18 limits concentration of oxygen within the ullage space 24 (shown in FIG. 1) of the fuel tank 20.

Figure 4:
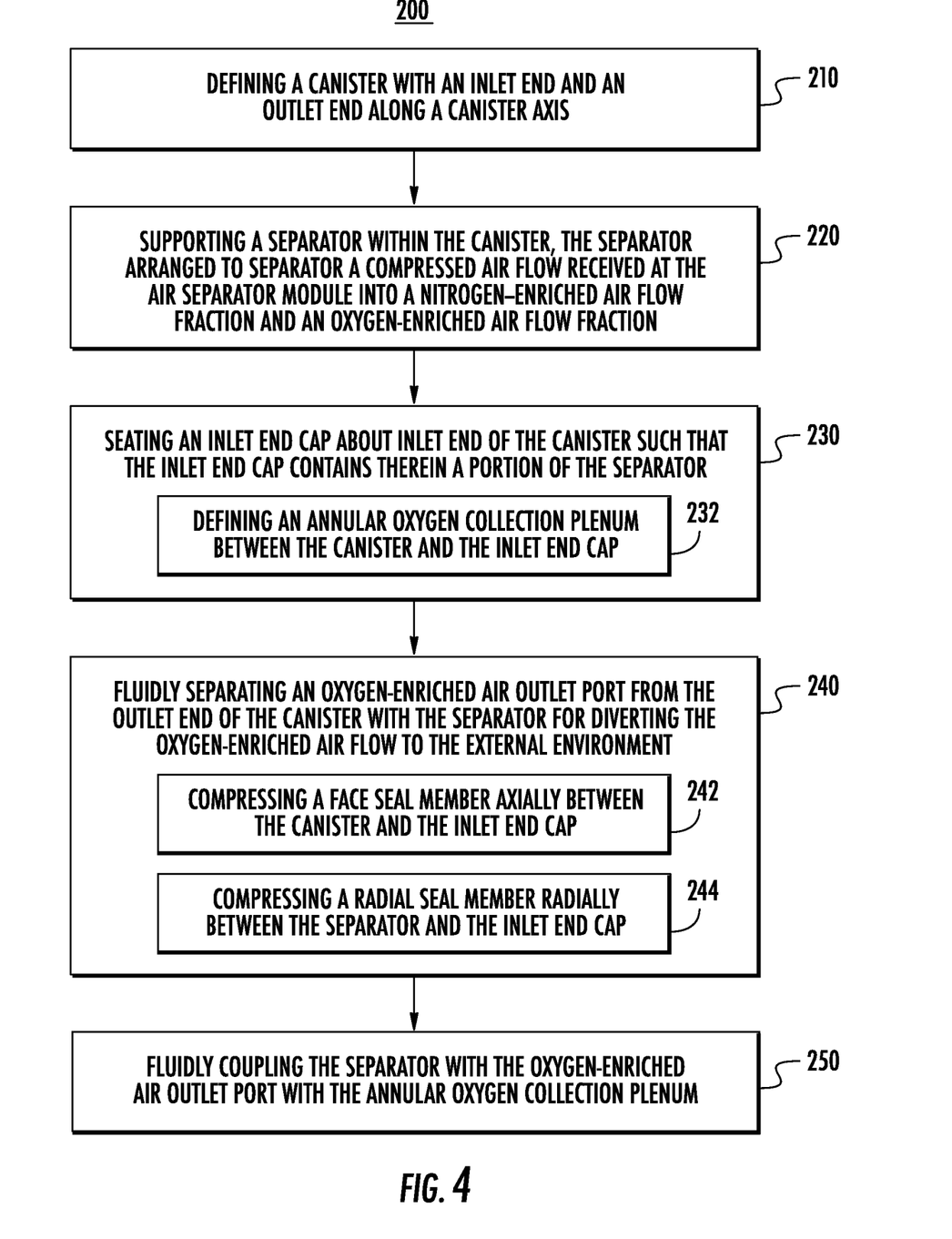
FIG. 4 is a block diagram of method of making an air separation module in accordance with the present disclosure, showing operations of the method according to an illustrative and non-limiting example of the method.

With reference to FIG. 4, a method 200 of making an air separation module, e.g., the air separation module 100 (shown in FIG. 1), is shown. The method includes defining a canister with an inlet end and an outlet end arranged along a canister axis, e.g., the canister 126 (shown in FIG. 1) with the inlet end 130 (shown in FIG. 1) and the outlet end 132 (shown in FIG. 1) arranged along the canister axis 134 (shown in FIG. 1), as shown with box 210. The method 200 also includes supporting a separator within the canister, e.g., the separator 122 (shown in FIG. 3), as shown with box 220. It is contemplated that separator be arranged to separate a compressed air flow, e.g., the compressed air flow 16 (shown in FIG. 1), into an oxygen-depleted air flow fraction and an oxygen-enriched air flow fraction, e.g., the oxygen-depleted air flow fraction 18 (shown in FIG. 1) and the oxygen-enriched air flow fraction 30 (shown in FIG. 1), as also shown with box 220.

As shown with box 230, an inlet cap is seated about the inlet end of the canister, e.g., the inlet cap 128 (shown in FIG. 2). It is contemplated that the inlet cap contains a portion of the separator, e.g., the resin body portion 162 (shown in FIG. 3) of the separator 122 (shown in FIG. 3) and the inlet cap portion 164 (shown in FIG. 3) of the separator 122, as also shown with box 230. In certain examples seating the inlet cap on the canister includes defining an annular oxygen collection plenum between the canister and the inlet cap, e.g., the annular oxygen collection plenum 182, as shown with box 232.

As shown with box 240, the method 200 also includes fluidly separating an oxygen-enriched air outlet port, e.g., the oxygen-enriched air outlet port 138 (shown in FIG. 2), from the outlet end of the canister using the separator for diverting the oxygen-enriched air flow fraction to the external environment. In certain examples fluidly separating the oxygen-enriched air outlet port from the outlet end of the canister includes compressing a face seal member, e.g., the face seal member 192 (shown in FIG. 3), axially between the canister and inlet cap, as shown with box 242. In accordance with certain examples fluidly separating the oxygen-enriched air outlet port from the outlet end of the canister includes compressing a radial seal member, e.g., the radial seal member 188 (shown in FIG. 3), radially between the canister and the separator and the inlet cap, as shown with box 244. As shown with box 250 the separator is thereafter fluidly coupled with the oxygen-enriched air outlet port using the annular oxygen collection plenum, as shown with box 250.

Fuel tanks, such as fuel tanks used to store liquid fuel in vehicles like aircraft, commonly contain fuel vapors within the ullage space of the fuel tank. Because such fuel vapors can present a fire hazard some vehicles include nitrogen generation systems with air separation modules. The air separation module is typically arranged to provide a flow of oxygen-depleted air to the fuel tank ullage space, limiting concentration of oxygen within the fuel tank ullage space and reducing (or eliminating entirely) the fire hazard potentially posed by the fuel vapors. The volume of nitrogen enriched air is generally constrained by the size of the air separation module and space allocated to the air separation module within the vehicle.

In examples provided herein air separation modules are provided having an inlet cap with an oxygen-enriched air outlet port. Portions of the canister and the separator are contained within the inlet cap and the canister perforated to provide fluid communication between the separator and the external environment. The fluid communication provided by the perforated portion of the canister allows oxygen-enriched air driven out of the separator by pressure of compressed air admitted to the separator to exit the air separation module through the inlet cap through oxygen-enriched air outlet port.

The term "about" is intended to include the degree of error associated with measurement of the particular quantity based upon the equipment available at the time of filing the application.

The terminology used herein is for the purpose of describing particular examples only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary example or examples, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular example disclosed as the best mode contemplated for carrying out this present disclosure, but that the present disclosure will include all examples falling within the scope of the claims.

What is claimed is:

1. An air separation module, comprising:
   a canister arranged along a canister axis and having an inlet end and an outlet end;
   a separator supported within the canister and arranged to separate a compressed air flow received at the air separation module into an oxygen-depleted air flow fraction and an oxygen-enriched air flow fraction;
   a filter module; and
   an inlet cap seated about the inlet end of the canister and containing therein a portion of the separator, wherein the inlet cap includes:
      a filter module mount that supports the filter module; and
      an oxygen-enriched air outlet port fluidly separated from the outlet end of the canister by the separator for diverting the oxygen-enriched air flow fraction to the external environment.

2. The air separation module of claim 1, wherein the canister has an oxygen-enriched air duct, the oxygen-enriched air duct extending tangentially from the inlet cap.

3. The air separation module of claim 1, wherein the inlet cap and the canister define between one another an annular oxygen collection plenum, the annular oxygen collection plenum fluidly coupling the separator with the oxygen-enriched air outlet port.

4. The air separation module of claim 1, wherein the inlet cap has an inlet cap flange connecting the inlet cap to the canister, and further comprising a face seal member arranged axially between the inlet cap flange and the canister.

5. The air separation module of claim 1, wherein the separator includes a resin body portion coupled to a canister portion by an inlet cap portion, the resin body portion and the canister portion of the separator contained within the inlet cap.

6. The air separation module of claim 5, wherein the inlet cap portion of the separator is contained within the canister, wherein the inlet cap portion of the separator is radially overlapped by the inlet cap.

7. The air separation module of claim 5, wherein the separator includes a hollow fiber mat supported within the inlet cap by the resin body portion of the separator.

8. The air separation module of claim 5, wherein the resin body portion of the separator is contained within the inlet cap and bounds an inlet cap plenum defined axially between the inlet cap and the resin body portion of the separator, and further comprising a radial seal member radially compressed between the inlet cap and the resin body portion of the separator.

9. The air separation module of claim 1, wherein the canister is a one-piece body including a perforated portion, the canister and the perforated portion are homogenous in composition and monolithic in construction.

10. The air separation module of claim 1, wherein the canister has a perforated portion, the perforated portion of the canister fluidly coupling the separator with the oxygen-enriched air outlet port.

11. The air separation module of claim 10, wherein the perforated portion of the canister is contained within the inlet cap.

12. The air separation module of claim 10, wherein the canister has a canister inlet flange extending about the canister, the canister inlet flange connecting the inlet cap to the canister, the canister inlet flange arranged axially between the perforated portion of the canister and the outlet end of the canister.

13. The air separation module of claim 1, further comprising an outlet cap seated on the outlet end of the canister, wherein the outlet cap has an outlet cap axial length, wherein the inlet cap has an inlet cap axial length, and wherein the inlet cap axial length is greater than the outlet cap axial length.

14. The air separation module of claim 1, wherein the canister has a canister inlet flange extending about the inlet end of the canister, wherein the canister has a canister outlet flange extending about the outlet end of the canister, and wherein the canister extends continuously and without a port between the canister inlet flange and the canister outlet flange.

15. A nitrogen generation system, comprising:
   an air separation module as recited in claim 1, wherein the inlet cap and the canister define between one another an annular oxygen collection plenum, the annular oxygen collection plenum fluidly coupling the separator with the oxygen-enriched air outlet port;
   a compressed air source fluidly coupled to the separator by the inlet cap, and therethrough disposed in fluid communication with the oxygen-enriched air outlet port; and
   a fuel tank in fluid communication with the outlet end of the canister, the separator fluidly coupling the fuel tank to the inlet cap, the separator fluidly separating the fuel tank from the oxygen-enriched air outlet port.

16. The nitrogen generation system of claim 15, wherein the canister has a perforated portion, the perforated portion of the canister fluidly coupling the separator with the oxygen-enriched air outlet port; and wherein the separator includes a resin body portion coupled to a canister portion by an inlet cap portion, the resin body portion and the canister portion of the separator contained within the inlet cap.

17. The nitrogen generation system of claim 15, further comprising:

an ozone converter supported by the inlet cap;
an inlet temperature sensor fluidly coupling the ozone converter to the separator;
an oxygen sensor fluidly coupled to the inlet temperature sensor by the separator;
an outlet temperature sensor fluidly coupled to the separator by the oxygen sensor; and
a flow control valve fluidly coupled to the oxygen sensor by the outlet temperature sensor.

\* \* \* \* \*